United States Patent [19]

Karl

[11] 4,354,790

[45] Oct. 19, 1982

[54] FEED MECHANISMS

[75] Inventor: Walter Karl, Sydney, Australia

[73] Assignee: Utilux Pty. Limited, Australia

[21] Appl. No.: 108,524

[22] Filed: Dec. 31, 1979

[51] Int. Cl.[3] .......... B23Q 7/06

[52] U.S. Cl. .......... 414/222; 414/680; 414/913; 29/753; 100/207

[58] Field of Search .......... 414/222, 680, 743, 913, 414/733; 74/54; 29/753; 100/207; 226/141; 198/621, 400

[56] References Cited

U.S. PATENT DOCUMENTS

| | | | |
|---|---|---|---|
| 2,228,245 | 1/1941 | Barker | 226/141 |
| 2,278,552 | 4/1942 | Maurer | 198/621 |
| 2,652,139 | 9/1953 | Baehr | 198/400 |
| 2,811,266 | 10/1957 | Udal | 414/733 |
| 3,141,432 | 7/1964 | Reeber | 74/54 |
| 3,793,872 | 2/1974 | Logan | 414/680 X |
| 4,187,730 | 2/1980 | Delorme | 74/54 |

FOREIGN PATENT DOCUMENTS

| | | |
|---|---|---|
| 284023 | 2/1967 | Australia . |
| 450792 | 1/1972 | Australia . |
| 1756350 | 1/1971 | Fed. Rep. of Germany . |
| 1405583 | 9/1975 | United Kingdom . |

*Primary Examiner*—John J. Love
*Assistant Examiner*—Terrance L. Siemens
*Attorney, Agent, or Firm*—Ostrolenk, Faber, Gerb & Soffen

[57] ABSTRACT

An apparatus for feeding articles to a work station, for example for feeding electrical terminals to a work station between the co-operating dies of a crimping machine, has a first shaft driven by a main shaft coupled through a clutch to a motor and a second shaft is arranged to be driven by the first shaft in an oscillatory motion having a forward motion and a return motion. A cam is fixed to the first shaft and a cam arm having a cam follower is secured to the second shaft. The second shaft has abutment element which engage against an adjustable stop to limit the extent of return motion of the second shaft, the adjustable stop being readily accessible for manual adjustment. A driven arm is connected to the second shaft for moving a feed device to the work station and the angular position of the driven arm relative to the second shaft is adjustable whereby the forward limit of motion of the feed device can be controlled.

11 Claims, 2 Drawing Figures

FEED MECHANISMS

Figure 1:
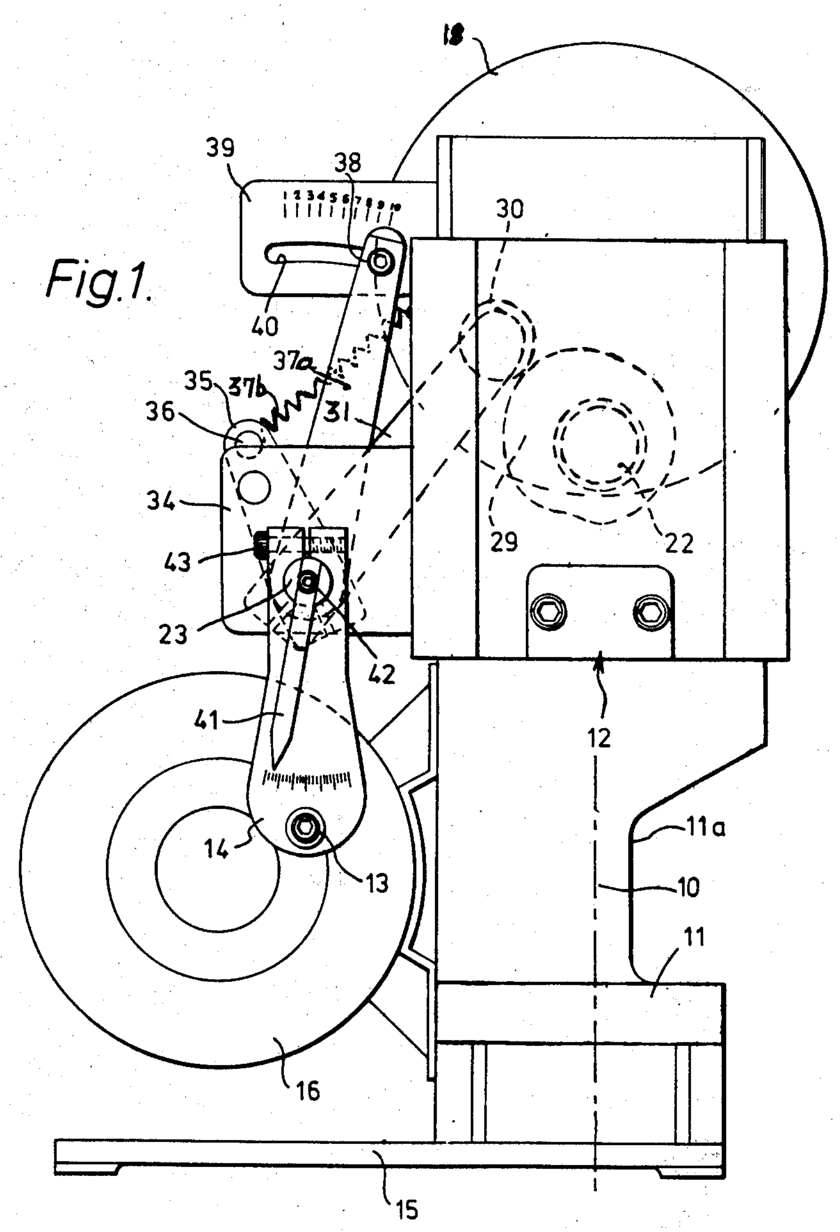

The present invention relates to feed apparatus which can be used for supplying articles to a work station and which is adaptable so that by suitable adjustments different kinds of articles can be supplied and accurately positioned at the work station.

One particularly important area of application of the present invention is to the problem of supplying electrical connectors to a work station at which the end of an electrical cable is to be crimped to the connector. For example, the connector and cable may be for use in an automobile harness or in an electrical appliance. Many different shapes, sizes and types of such electrical connectors are known and it is desirable to provide a machine which is not only capable of accurately supplying and positioning the connector at the work station but also is readily capable of adjustment to suit different shapes, sizes and types of connectors.

Often the connectors are supplied protruding laterally from a common spine and, in a crimping operation, crimping dies also act to sever the connector from the spine. The electrical cable, which in many but not all applications has a predetermined amount of conductor already stripped from the end of the cable, is supplied either by hand or automatically to the work station and is located accurately before the crimping operation takes place.

Hitherto machines for supplying such electrical connectors to work stations, such as crimping stations, have been cumbersome, slow and often difficult to adjust. It is desirable that the apparatus be adjustable by an unskilled operator of the machine, the adjustment being carried out with precision and speed.

One known machine for applying terminals is that described in Australian Patent Specification No. 284,023.

The present invention provides apparatus for feeding work pieces to work station (for example for feeding electrical terminals to a crimping station) the apparatus comprising:

(a) a first shaft adapted to be driven;

(b) a second shaft rotatably mounted;

(c) drive means for transmitting drive from the first shaft for driving the second shaft in an oscillatory cycle of forward and return movement;

(d) limit means for limiting motion of the second shaft in the direction of return movement, the limit means having accessible adjustment means to permit adjustment of the limit of motion of the second shaft; and (e) a driven arm connected to the second shaft for applying motion to a feed device for the work pieces, the angular position of the driven arm relative to the second shaft being adjustable for controlling the forward limit of motion of the feed device.

In preferred embodiments of the invention, the device means is provided by a cam fixed to the first shaft and a cam arm having a cam follower, the cam arm being fixed to the second shaft, and biasing means being provided for biasing the second shaft such that the cam follower is urged to engagement on the cam and the second shaft is biased in a direction corresponding to return motion. This arrangement can be especially advantageous for providing an accurate system in which backlash is minimized when the article is made with ordinary manufacturing tolerances.

The limit means can be advantageously provided in the form of abutment means associated with the second shaft and stop means, against which the abutment means is adapted to engage for the purpose of limiting the extent of the return motion of the shaft, fixedly mounted in a desired position on the apparatus, the stop means being adjustable to limit the motion of the second shaft. This arrangement can be especially advantageous in that, because the stop means is a fixed device, it can project well clear of the moving parts of the apparatus so that the necessary safety covers do not need to enshroud the adjustable portion of the stop means. This greatly facilitates rapid and accurate setting of the stop means by the operator.

The driven arm is preferably clamped onto the second shaft and adapted to be displaced and secured at a desired position relative to the second shaft for the purpose of setting the forward limit of motion of the feed device prior to use.

Preferably the apparatus is arranged with readily visible indicator scales associated with the adjustment of both the stop means and the driven arm thereby permitting the operator merely by the use of simple tools to position the stop means and the driven arm to a predetermined position relative to the indicator to suit a particular connector. Since the stop means does not normally move, guarding is not necessary and only a simple guard is all that would be necessary to protect the driven arm.

The invention in another aspect concerns a machine for crimping terminals to cables and comprising a rotatable shaft having a driven arm adjustably mounted thereon so the driven arm is moved with the shaft as it rotates in a forward direction whereby a feed device can be mounted on the driven arm to supply a terminal to a work station before a reverse motion retracts the feed device, the improvement comprising indicator means fixed to the second shaft, means for adjustably clamping the driven arm to the second shaft and complementary indicator means on the driven arm whereby the desired relative position of the driven arm and the second shaft can be set.

According to yet a further aspect of the present invention there is provided a crimping machine for crimping electrical terminals onto cables and characterized by means for driving a shaft back and forth in a cycle of operation, the shaft having associated therewith a feeding device for supplying an electrical terminal during a forward motion and having abutment means for engaging adjustable stop means for limiting return motion of the shaft, the stop means comprising an arm pivotally mounted at one end over the second shaft and adjustably fixable at a remote portion, the remote portion being clearly accessible to facilitate rapid adjustment by pivotal motion of the arm, indicator means being provided to facilitate rapid setting of the arm to a desired position.

The invention most preferably is applied to apparatus for crimping electrical terminals onto an electrical conductor and including the apparatus as described above and optionally including the provision of a main shaft adapted to be driven by an electric motor through a clutch unit and having a brake assembly associated with control means arranged automatically to operate the brake to stop the main shaft at desired points of an operating cycle, said first shaft being driven by gearing connecting the main shaft and first shaft; the apparatus also includes means for driving a pair of dies into working engagement in timed relationship with said cam such that the dies close to crimp the connector to the cable.

Preferably the apparatus is such that an upper die is arranged to be mounted on a drive crank attached to the first shaft.

The entire apparatus may be manufactured as a relatively compact unit including an electric motor adapted to run at constant speed and to drive the clutch unit through a belt and pulley connection; a switch unit is adapted to be actuated by the operator to commence the cycle of operations, for example through a solenoid operated control for the clutch and brake units.

The cycle of operations is such that when the switch is actuated, the clutch engages and the brake disengages thereby rapidly accelerating the main shaft and the first shaft so that the cam rotates thereby rotating the second shaft to advance a feeding device connected to the drive arm whereby the terminal is positioned precisely at the correct location. It will be noted that the forward motion is a positive motion without backlash and therefore high precision can be obtained. The cam has a dwell period defined by a constant radius of arc and at this point the second shaft engages the drive crank so that the crank rapidly moves the top die down onto the bottom die to effect the crimping operation and then to retract the upper die. The cam's profile then permits reverse motion of the cam follower, the drive shaft, drive arm and the feed finger device under the biasing influence of the return spring until the abutment means associated with the drive shaft engages the limit stop.

When the cycle of operations is completed, the clutch is disengaged and a further actuation of the switch by the operator is required to cause the next cycle of operations to follow.

According to yet a further aspect of invention relating to machines for applying electrical terminals to cables in a crimping operation, there is provided means for engaging cooperating dies in a crimping step, the dies moving along a first line of action, means for supplying electrical terminals in sequence for a cycle of operations by a feeding device, the terminals being fed in a direction substantially at right angles to the first line of action and the apparatus being constructed with clearances such that a cable to be attached to the connector may be moved into the work station by motion at right angles to its longitudinal direction, said movement being at right angles to said first line of action and being either substantially parallel to or substantially at right angles to the line of feed of the electrical terminals.

This arrangement can be especially useful to permit the apparatus to function with an automatic machine for feeding the cable to be terminated, the apparatus being capable of accommodating terminals arranged in end to end configuration or in side by side configuration extending laterally from a common spine. Preferably the apparatus also embodies the other inventive aspects described hereinbefore.

Figure 2:
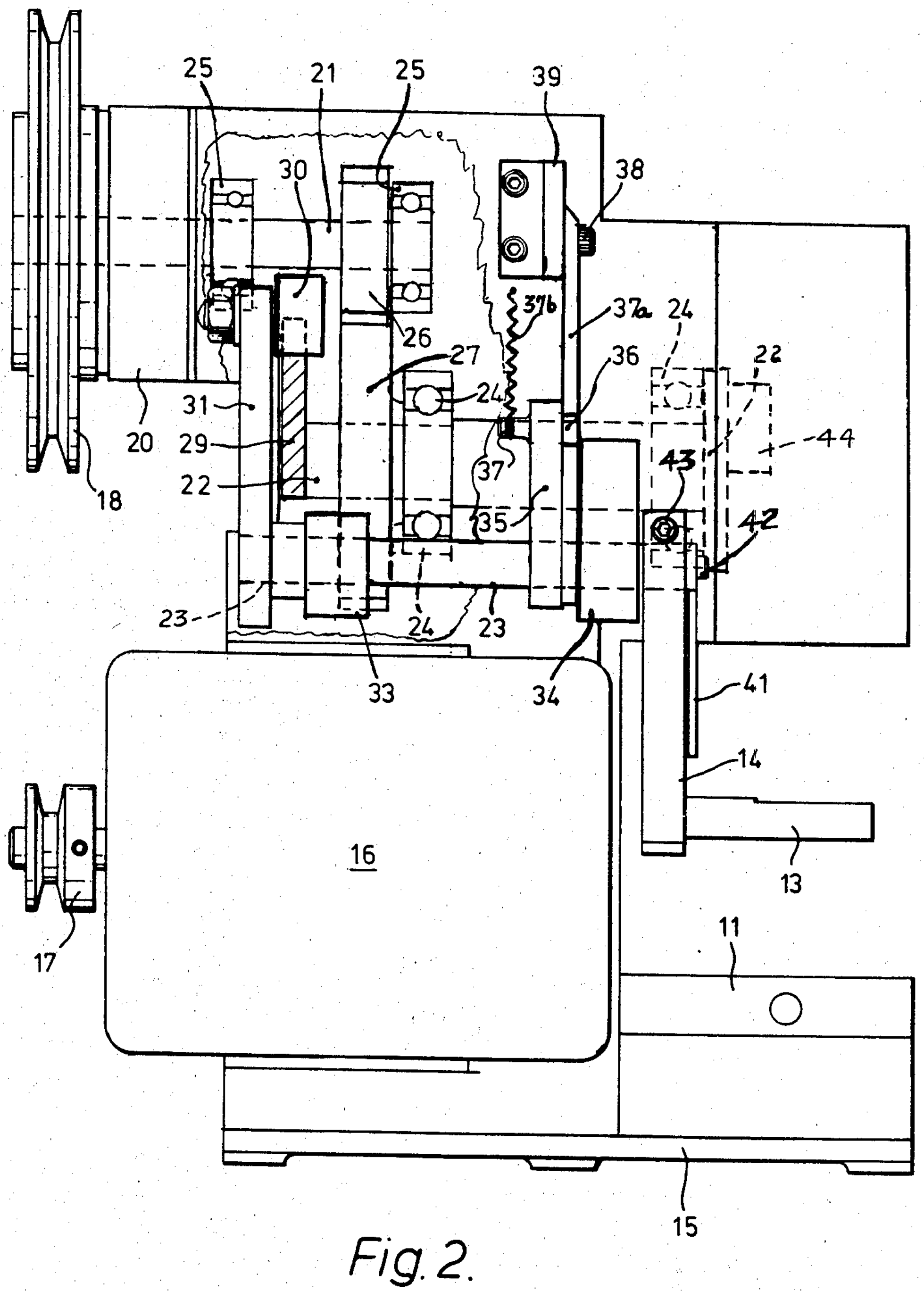

For illustrative purposes only, a preferred embodiment of the invention will now be described with reference to the accompanying drawings, of which:

FIG. 1 is a front elevation of the apparatus for feeding electrical terminals to a crimping station; and FIG. 2 is a side elevation of the apparatus of FIG. 1.

Referring first to FIG. 1, the apparatus has a vertical axis 10 for a crimping operation, a lower fixed crimping die being adapted to be mounted on a fixed platform 11 and a moveable die being adapted to be mounted in a ramlike carrier 12. Electrical connectors, pre-formed in a shape suitable for crimping and connected in series, are fed from a supply reel not shown in the drawings to a supply finger of conventional design which for the purpose of clarity is also not shown in the drawings but which is mounted on a mounting bar 13. The bar 13 is fixed to a drive arm 14 which is adapted to oscillate during a cycle of operations as will be described below.

The electrical connectors may be arranged side by side so as to extend with their longitudinal directions at right angles to the line of connectors, each connector extending laterally from a common spine or the connectors could be attached end to end. The illustrated embodiment of the invention has been especially designed to be operable with an automatic cable handling machine which advances the cable to a terminating station at which the apparatus is disposed. Normally the reel holding the series of electrical terminals supplies the line of terminals downwardly generally vertically at the lefthand side of the machine when viewed as in FIG. 1 to curve around to project from left to right in a substantially horizontal direction for advancement by the feed device which is not shown in the drawing but which is adapted to be connected to a mounting bar 13.

The apparatus comprises a base 15, an electric motor 16 and a drive assembly for the mounting bar which is supported on the drive arm 14. The electrical connectors are fed over the platform 11 and the body of the apparatus is recessed as shown at 11*a* at the righthand side of FIG. 1 so that a cable may be advanced laterally in a direction at right angles to the direction of feed of the terminals and at right angles to the axis of crimping 10.

The electric motor 16 has a drive pulley 17 and is designed to run continuously. A drive belt not shown in the drawing drives a second pulley 18, the mechanical advantage being such that this pulley rotates at lower speed. The pulley is mounted to a flange mounted clutch 20. The clutch in turn drives a main shaft 21 which is arranged in parallel with a first shaft 22 and a second shaft 23 on which the drive arm 14 is mounted. The shafts 21 and 22 are mounted in respective sets of ball bearings 25 and 24 and have respective gear wheels 26 and 27 fixed thereto and in constant mesh. The entire drive assembly is adapted to be stopped by a brake assembly.

FIG. 2 illustrates the apparatus partly in cut away view with part of the main front casing removed and for clarity interior walls of the casing for supporting the bearings have been omitted. When in use a safety guard would be placed over the normally movable parts including a return arm 35, an aperture in the top of the safety guard being provided for a limit arm 37*a*.

As shown in FIG. 2, the left hand end of the first shaft 22 carries a cam 29 with the portion of the cam which would be visible in the elevation being hatched in order to highlight this component. A cam follower arm 31 which is welded or otherwise fixed to the left hand end of the second shaft 23 carries a rotatable wheel 30 which acts as a cam follower.

The second shaft 23 is rotatably mounted in the bearing sleeves in mounting brackets 33 and 34.

The second shaft 23 is biased in its return direction which is a clockwise direction as shown in FIG. 1 by means of a return arm 35 having a circular abutment stop 36 on its right hand side as shown in FIG. 2 and a grooved mounting pin 37 on the left hand side. A helical extension spring 37*b* is connected from the grooved pin 37 to an upper part of the apparatus, the spring urging the stop 36 against the edge of a limit arm 37*a*, the lower end of which is rotatably mounted on the second shaft 23 and the upper end of which is adapted to be clamped by a clamping bolt 38 to a mounting bracket 39. The bracket 39 has an arcuate slot 40 along which the mounting bolt 38 can pass and a numerical scale is inscribed on the upper portion of the plate so that the operator can set the arm to the desired position with accuracy.

At its right hand end as shown in FIG. 2, the second shaft 23 carries a pointer 41 fixed to the end of the shaft by a screw 42.

Immediately adjacent the pointer 41 is the drive arm 14, the upper end of which is split so as to be arm clamped in the desired rotary position by a clamping screw 43.

The upper die is arranged to be driven down into mating co-operation with the lower die through a drive unit which will not be described in detail since it is conventional. As shown in FIG. 2 a drive crank 44 is mounted at the end of the first shaft 22.

I claim:

1. Apparatus for feeding work pieces to a work station, the apparatus comprising:

(a) a first shaft adapted to be driven;
(b) a second shaft rotatably mounted;
(c) drive means for transmitting drive from the first shaft for driving the second shaft in an oscillatory cycle of forward and return movement;
(d) stop means for limiting motion of the second shaft in the direction of return movement, the stop means comprising abutment means fixed to and extending outwardly from the second shaft, and a normally fixed, elongated stop arm, pivotally mounted for motion about an axis substantially parallel to the axis of the second shaft and having a manually accessible adjustment means for securing the stop arm in a desired position such that an engagement portion of the stop arm provides an abutment surface for said abutment means at a location remote from the adjustment means; and
(e) a driven arm connected to the second shaft for applying motion to a feed device for the work pieces, the angular position of the driven arm relative to the second shaft being adjustable for controlling the forward limit of motion of the feed device.

2. Apparatus for feeding work pieces to a work station comprising:

(a) a first shaft arranged to be driven;
(b) a cam fixed to the first shaft;
(c) a cam follower mounted on a cam arm;
(d) a second rotatable shaft on which the cam arm is secured, and the cam and the cam follower being such that the second shaft is arranged to be driven through a cycle of movement comprising a forward rotation and a return rotation;
(e) abutment means mounted on the second shaft for movement therewith along a path of movement;
(f) a mounting bracket;
(g) adjustable stop means comprising a normally fixed, elongated stop arm mounted on the mounting bracket by manually accessible adjustment means, and the stop arm being pivotally mounted for motion about an axis substantially parallel to the axis of the second shaft, the stop arm having an engagement portion remote from the adjustment means for engaging with the abutment means for limiting the extent of return motion of the second shaft;
(h) means for biasing the second shaft in the direction of its return motion against the action of the cam which is arranged to provide positive forward motion to the second shaft; and
(i) a driven arm connected to the second shaft for applying motion to a feed device for the work piece, the driven arm having adjustment means for adjusting rotatably the driven arm relative to the second shaft and securing the driven arm in a desired position whereby the forward limit of motion of the feed device can be accurately controlled.

3. Apparatus as claimed in claim 1 or claim 2 and further including visible indicator means associated respectively with adjustment means for the stop means and the driven arm, the adjustment means being readily accessibe and capable of adjustment with the aid only of simple tools.

4. Apparatus as claimed in claim 3, wherein the indicator means for the driven arm comprises a pointer fixed to the end of the second shaft and positioned adjacent to the driven arm which has indicator markings on a face thereof extending in a plane transverse to the axis of the second shaft.

5. Apparatus as claimed in claim 1, wherein the stop arm has one end mounted rotatably over the second shaft and the other end is adapted to be clamped by the adjustment means, the adjustment means comprising a clamping element and a fixed plate, the position of clamping being adjustable along an arc centered on the axis of the second shaft.

6. Apparatus as claimed in claim 5, wherein the abutment means comprises an arm fixed to the second shaft and located adjacent to the stop arm, the abutment arm having a laterally projecting stop element fixed thereto.

7. Apparatus as claimed in claim 2, wherein the biasing means comprises a helical extension spring.

8. Apparatus for crimping electrical terminals onto electrical conductors comprising, in combination, the apparatus as claimed in either claim 1 or 2 and further comprising a main shaft adapted to be driven by an electric motor through a clutch unit, a brake assembly associated with control means for automatically operating the brake assembly to stop the main shaft at a desired point in an operating cycle, said first shaft being driven by gearing connecting the main shaft and the first shaft, and means for mounting co-operating dies for effecting a crimping operation during which the dies are driven toward one another.

9. Apparatus for crimping electrical terminals onto electrical conductors comprising, in combination, the apparatus as claimed in claim 8 wherein the dies are movable along a first line of action, electrical terminals being supplied in sequence by the feed device mounted on the driven arm, the terminals being fed in a direction substantially at right angles to said first line of action and the apparatus having clearances whereby an electrical conductor to be attached to the electrical terminal may be moved into the work station by motion at right angles to its longitudinal direction and at right angles to said first line of action and being either substantially parallel to or substantially at right angles to the line of feed of the electrical terminals.

10. Apparatus for crimping electrical terminals onto electrical conductors comprising, in combination, the apparatus of either of claims 1 or 2, and including means for mounting and bringing together co-operating dies in a crimping operation, the dies being movable along a first line of action, the electrical terminals being supplied in sequence by the feed device mounted on the driven arm, the terminals being fed in a direction substantially at right angles to the first line of action and the apparatus having clearances whereby an electrical conductor to be attached to the electrical terminal may be moved into the work station by motion at right angles to its longitudinal direction and at right angles to said first line of action and being either substantially parallel to or substantially at right angles to the line of feed of the electrical terminals.

11. Apparatus as claimed in claim 2 wherein the stop arm has one end mounted rotatably over the second shaft and the other end is adapted to be clamped by the adjustment means, the adjustment means comprising a clamping element and the mounting bracket comprising a fixed plate, the position of clamping being adjustable along an arc centered on the axis of the second shaft.

* * * * *